March 2, 1937.  A. C. WINGO  2,072,784
VOLTAGE REGULATION
Filed Oct. 9, 1935
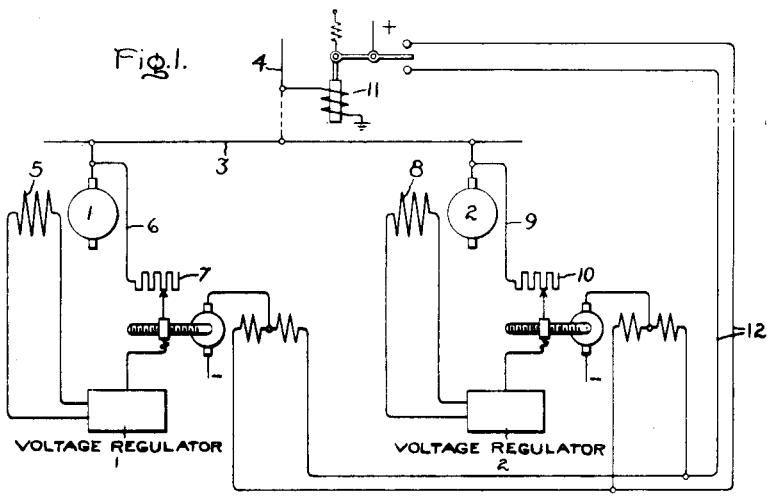
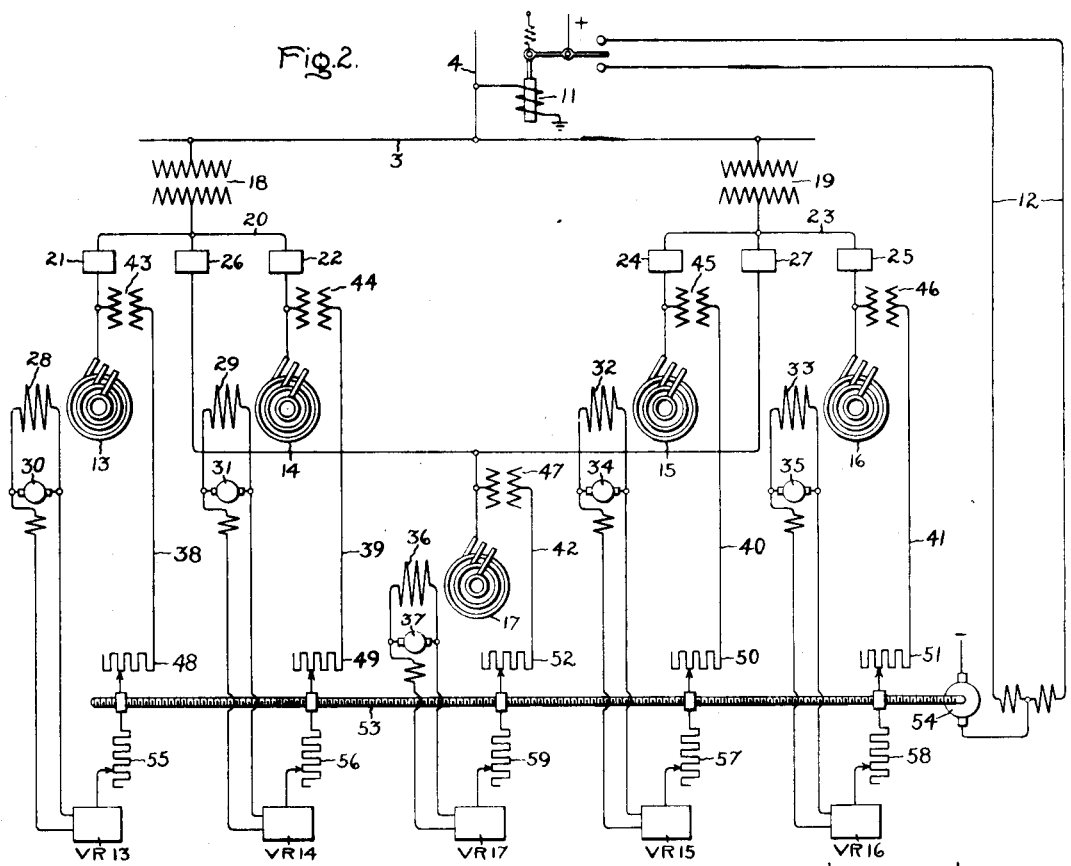
Inventor:
Adgor C. Wingo,
by Harry E. Dunham
His Attorney.

Patented Mar. 2, 1937

2,072,784

UNITED STATES PATENT OFFICE 2,072,784

VOLTAGE REGULATION

Adgar C. Wingo, Los Angeles, Calif., assignor to General Electric Company, a corporation of New York Application October 9, 1935, Serial No. 44,235

7 Claims. (Cl. 171—312)

My invention relates to voltage regulation, and more particularly to compensating voltage regulating systems for voltage drops produced by current flow.

When an electric current flows through a conductor a voltage drop is produced therein which is proportional to the impedance of the conductor. In electrical distribution and transmission systems wherein it is desired to maintain the voltage substantially constant at a center of distribution which is relatively remote from the generators and their automatic voltage regulating equipment it is customary to compensate for this voltage drop by means of devices known in the art as line drop compensators which respond to the current which produces the voltage drop. In certain instances, however, it is exceedingly difficult and impractical to utilize the conventional line drop compensator. For example, in the Boulder Dam generating station there is provision for a normally idle spare generator which can be selectively connected to either one of two busses each of which is normally energized by two parallel connected generators. Thus, the spare generator may replace any one of the four main generators which might fail. As a conventional line drop compensator should produce a current for the regulator of each generator which is proportional to the current of that generator it will require a relatively complicated and expensive switching equipment to secure proper line drop compensator connections when such a spare generator is employed. Furthermore, such a switching arrangement will involve the switching of current transformer secondary circuits which is considered bad practice as there is a danger of excessively high voltages being produced should the secondaries of current transformers be open circuited.

In accordance with my invention I provide a novel line drop compensating system in which voltage responsive means at the point where constant voltage is to be maintained is arranged to control the settings of the generator voltage regulators, which regulators normally act to maintain constant terminal voltage of their associated generators for any given setting of the regulators. With such a system, generator voltage normally is maintained constant and if the current flow or output of the generator changes, thus changing the value of the line drop, the line drop compensating means automatically responds to the voltage change and changes the settings of the regulators by an amount just enough to compensate for this line drop.

I have also found that in such a system, where a plurality of generators are operated in parallel, there is a tendency for the means for adjusting the setting of the individual regulators to change the settings by unequal amounts thus causing unequal generator voltages and circulating currents. In accordance with another feature of my invention I prevent this undesirable operation by interlocking or tying together all of the means for varying the settings of the individual regulators by any suitable mechanical or electrical means.

An object of my invention is to provide a new and improved voltage regulating system.

A further object of my invention is to provide a simple, reliable and inexpensive line drop compensating means for electrical distribution for transmission systems.

My invention will be better understood from the following description taken in connection with the accompanying drawing and its scope will be pointed out in the appended claims.

In the drawing Fig. 1 is a simplified one-line diagram of a simple embodiment of my invention, while Fig. 2 is a similar diagram of a modification of my invention as applied to a system provided with two sets of parallel connected main generators and a spare generator for selective connection with either of the sets.

Referring now to the drawing and more particularly to Fig. 1 a pair of generators 1 and 2 are connected in parallel to a bus 3 to which is connected a load or power delivery circuit 4, which may be a high voltage transmission line. Generators 1 and 2 may be either direct or alternating current machines. Each of the generators is provided with its respective automatic voltage regulator which may be of any of the several types which are well known in the art. The regulator for generator 1 is connected to control the current in a field winding 5 for this generator. The regulator responds to the voltage of generator 1 by means of a circuit 6 connected to the generator and included therein is a variable motor operated rheostat 7 for controlling the setting of the regulator. Similarly, the regulator for generator 2 controls the current in a field winding 8 for this generator and it is connected to respond to the voltage of the generator 2 by means of a circuit 9 containing a motor operated rheostat 10 for varying the regulator setting. Connected to respond to the voltage at any particular point on load circuit 4, where it is desired to maintain substantially constant voltage, there is a voltage responsive controller which is shown as a contact making voltmeter 11. By means of suitable control circuits 12 the voltage responsive controller 11 controls the direction of operation of the motor-operated rheostats 7 and 10 for controlling, respectively, the voltage settings of the regulators for generators 1 and 2.

In the operation of Fig. 1 if both generators 1 and 2 are being driven by suitable prime movers (not shown) and load conditions are steady, the various parts will assume the positions shown in the drawing. If now the load on circuit 4 should increase there will be two effects. The first will be to increase the internal voltage drop in each of the generators which will be reflected in a change in terminal voltage of these machines. This voltage drop each of the automatic regulators will act to correct for, in the well-known manner of all automatic voltage regulators. At the same time there will be a voltage drop produced by the current flow through the conductors including the bus 3 and the part of the transmission circuit 4 between the contact-making voltmeter 11 and the bus. This voltage drop will cause the contact-making voltmeter 11 to close one of its contacts thereby establishing a circuit from the positive side of the supply source through one of the conductors 12 and then through each of the two motors of the rheostats 7 and 10 in parallel to the negative side of the supply source. This will cause the motors to turn in such a direction as to increase the resistance values of the rheostats 7 and 10 thus raising the voltage settings of the regulators. This action will continue until the voltage, at the point where the contact-making device 11 is connected to the transmission circuit 4, is restored to normal at which time the control circuit 12 will be broken and the rheostats will come to rest. The generators will now have terminal voltages which are higher than they previously have been by an amount exactly equal to the line drop produced by the load current.

Similarly, if the load current should decrease, each of the individual regulators will correct for the increase in individual internal voltage of the machines caused by the decrease in internal voltage drop therein. At the same time there will tend to be a higher than normal voltage at the point where the contact-making device 11 is connected to the transmission circuit 4 because there has been a decrease in line drop. This causes the contact-making device to engage its other contact thereby energizing the motors for the rheostats 7 and 10 for reverse rotation so that the rheostats 7 and 10 decrease their resistance values thus decreasing the voltage setting of the individual regulators by making them hold a lower voltage which is just sufficient to compensate for the current produced line drop change. When the voltage returns to normal the contact-making voltmeter 11 breaks the control circuit and the rheostats come to rest.

In Fig. 2 a plurality of alternating current generators 13, 14, 15 and 16 and a spare generator 17 are arranged for connection to the bus 3 through step-up transformers 18 and 19. Generators 13 and 14 are connected in parallel to an individual bus 20 through separate circuit breakers 21 and 22, respectively, while the generators 15 and 16 are connected in parallel to another bus 23 through separate circuit breakers 24 and 25, respectively. Spare generator 17 is adapted for selective connection to either bus 20 or 23 by means of circuit breakers 26 and 27. Generators 13 and 14 are provided with separate field windings 28 and 29 which are energized by respective exciters 30 and 31 while generators 15 and 16 are provided with separate field windings 32 and 33 which are energized by respective exciters 34 and 35. The spare generator 17 is provided with a field winding 36 energized by an exciter 37. Each of the generators 13, 14, 15, 16 and 17 has its voltage controlled by an individual automatic voltage regulator VR—13, VR—14, VR—15, VR—16, and VR—17 respectively. These regulators may be of any one of several well-known types and in the actual Boulder Dam generating station, of which Fig. 2 is a partial representation, voltage regulators of the type which are disclosed and claimed in Patent No. 1,848,852 granted March 8, 1932, on an application of L. W. Thompson and assigned to the assignee of the present application, are used. However, as the details of the particular automatic voltage regulators form no part of my present invention, and as they are relatively complicated, it is best not to go into a detailed showing and description of such devices. Each of the regulators VR—13, VR—14, VR—15, VR—16, and VR—17 has its respective voltage responsive control circuit 38, 39, 40, 41 and 42, which is energized from the terminals of its respective generator through potential transformers 43, 44, 45, 46 and 47, respectively.

Each of the voltage control circuits for the regulators is provided with automatically operated rheostats 48, 49, 50, 51 and 52 for controlling the setting of its associated regulator and in accordance with one feature of my invention these rheostats are interlocked, or mechanically tied together. As illustrated these rheostats are mechanically interconnected by means 53 consisting of a threaded shaft and slidable contact-carrying nuts thereon. This shaft is arranged to be operated by a suitable pilot motor 54 which is controlled by the contact-making device 11 through the control circuits 12. In addition, each of the regulators is provided with a manually operated rheostat 55, 56, 57, 58 and 59, respectively, for providing necessary manual adjustment of the individual voltages.

Fig. 2 operates in the same manner as Fig. 1 except that through the mechanically interconnected means 53 all of the automatic setting adjusting rheostats 48, 49, 50, 51 and 52 are operated in step with each other so that when the voltage responsive device 11 operates in response to a change in line drop the voltage setting of each of the individual regulators is changed by an equal amount.

Normally, of course, spare generator 17 is out of service and the circuit breakers 26 and 27 are open. The operation of the rheostat 52 thus has no effect one way or the other. However, this rheostat is always in the proper position to provide the necessary terminal voltage of generator 17 whenever it should be called upon to supply power. There are normally no losses in the rheostats 52 and 59 because as there is no voltage produced by generator 17, due to the fact that it is normally idle, there is no current flow in the resistors. Therefore, the only losses are the relatively insignificant losses required to operate the rheostat 52.

As a result of the arrangement shown in Fig. 2 the voltage at the point where the contact-making device is connected to the transmission circuit 4 is maintained substantially constant regardless of changes in load current or in changes of the number and arrangement of generators connected to the system, and due to the mechanical coupling 53 between the various automatic rheostats 48—52 inclusive, this line drop compensation is secured by means of the equal changes in the settings of the regulators for the individual generators so that the automatic equipment does not tend to produce inequality of voltage.

While I have shown and described particular embodiments of my invention, it will be obvious to those skilled in the art that changes and modifications can be made without departing from my invention and I, therefore, aim in the appended claims to cover all such changes and modifications as fall within the true spirit and scope of my invention.

What I claim as new and desire to secure by Letters Patent of the United States, is:—

1. In an electrical power supply system, an electric generator connected to a power delivery circuit, an automatic regulator for maintaining the voltage of said generator substantially constant for any setting of the regulator, and automatic line drop compensating means comprising voltage sensitive means responsive to the voltage of a particular point on said circuit for varying the setting of said regulator in such a manner as to maintain the voltage at said point substantially constant regardless of the line drop between said point and said generator.

2. In an electrical power supply system, an electric generator, an automatic voltage regulator for said generator connected to respond to the terminal voltage of said generator, a load circuit, electrical conducting means connecting said generator to said load circuit, a contact-making voltmeter responsive to the voltage of a point on said load circuit, and a motor-operated rheostat controlled by said contact-making voltmeter and arranged to change the setting of said regulator in such a manner as to maintain the voltage at said point constant regardless of the voltage drop in said conducting means.

3. In an alternating current power system, a high voltage transmission line, a plurality of alternating current generators, step-up transformers connecting said generators to said line, an individual automatic voltage regulator for each of said generators connected to respond to the voltage of its associated generator, and means responsive to the voltage of said transmission line for simultaneously varying the voltage settings of each of said regulators.

4. In an alternating current power system, a high voltage transmission line, a plurality of alternating current generators, step-up transformers connecting said generators to said line, an individual automatic voltage regulator for each of said generators connected to respond to the voltage of its associated generator, a separate motor-operated rheostat for controlling the voltage setting of each of said regulators, a contact-making voltmeter connected to be responsive to the voltage of a point on said transmission line, and connections for simultaneously controlling the operation of the respective motors of said rheostats from said contact-making voltmeter in such a manner as to maintain the voltage of said point constant irrespective of variations in current flow in said system.

5. In an electric transmission system, an electric circuit, a plurality of generators connected to said circuit, individual automatic regulators for each of said generators connected to respond to the voltage of its associated generator, individual adjusting means associated with each regulator for controlling the voltage setting of its associated regulator, means responsive to the voltage of a point on said supply circuit removed from the terminals of said generators for controlling said individual adjusting means, and means interconnecting said individual adjusting means for causing operation thereof in unison.

6. In an electric power system, an electric circuit, a plurality of generators connected to said circuit, an individual automatic regulator for each of said generators connected to respond to the voltage of its associated generator, a separate rheostat for controlling the voltage setting of each of said regulators, a motor, coupling means for operating all of said rheostats in unison from said motor, and a contact-making voltmeter connected to be responsive to the voltage of a point in said circuit for controlling the operation of said motor.

7. In an alternating current power system, a high voltage transmission line, a plurality of alternating current generators, step-up transformers connecting said generators to said lines, an individual automatic voltage regulator for each of said generators connected to respond to the voltage of its associated generator, a separate rheostat for controlling the voltage setting of each of said regulators, a motor, mechanical coupling means for operating all of said rheostats together from said motor, a contact-making voltmeter connected to be responsive to the voltage of a point on said transmission line, and connections for controlling the operation of said motor from said contact-making voltmeter in such a manner as to maintain the voltage of said point constant irrespective of variations in current flow in said system.

ADGOR C. WINGO.